Jan. 9, 1934.   L. J. GRUBMAN   1,943,117
ARTIFICIAL EYES FOR DOLLS, MANIKINS, AND THE LIKE
Filed Oct. 17, 1931
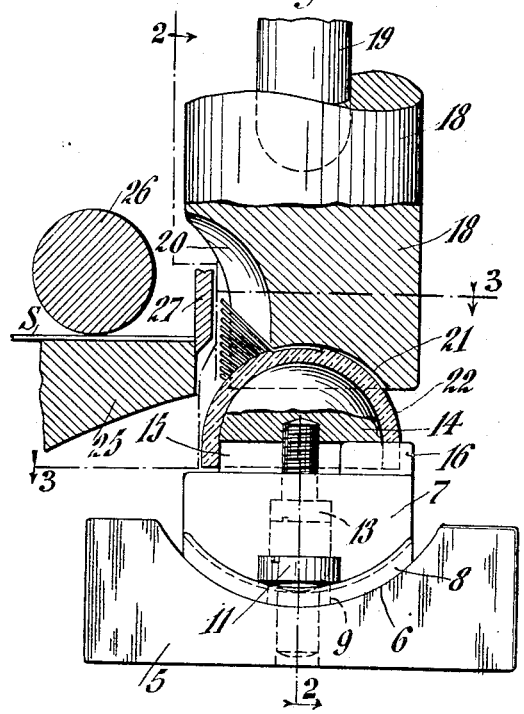
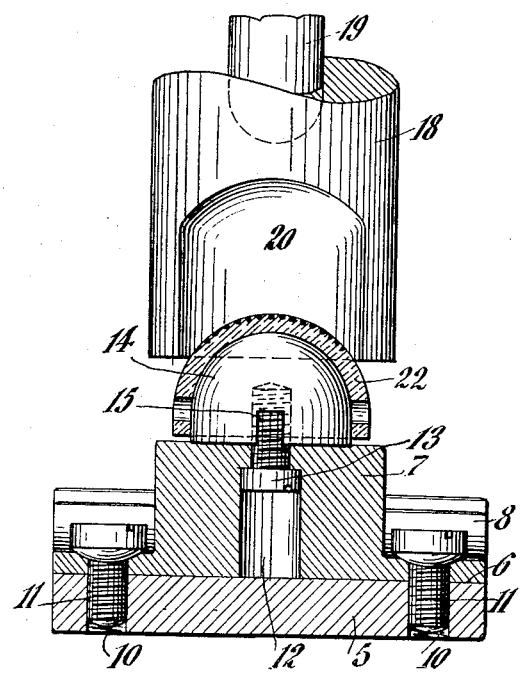
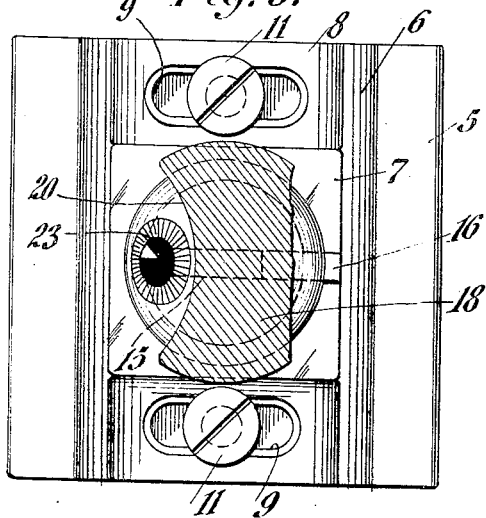
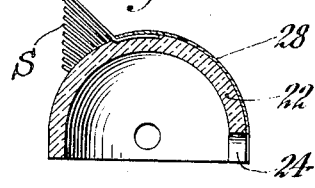
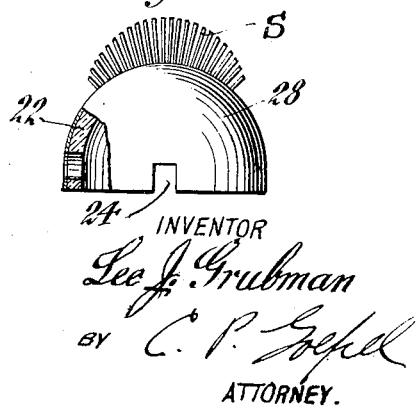
INVENTOR
Lee J. Grubman
BY C. P. Goepel
ATTORNEY.

Patented Jan. 9, 1934

1,943,117

UNITED STATES PATENT OFFICE 1,943,117

ARTIFICIAL EYES FOR DOLLS, MANIKINS, AND THE LIKE

Leo J. Grubman, Belle Harbor, Long Island, N. Y., assignor to Margon Corporation, New York, N. Y., a corporation of New York Application October 17, 1931. Serial No. 569,411

2 Claims. (Cl. 46—40)

This invention relates to artificial eyes for dolls, manikins and the like, and has for its purpose to provide certain improvements therein which will enhance the realistic simulation of the human eye to an extent not attainable in the use of prior art articles of this kind.

The subject matter of the present application which is disclosed but not claimed in my application Serial No. 170,447, filed February 24, 1927, now Patent No. 1,770,401, consists essentially in the eye member proper having a substantially hemispherical convex surface upon which the representation of the human eye pupil is painted or otherwise realistically delineated, together with eyelash strands having one of their ends inseparably bonded or incorporated in the structure of the eye member in appropriate relation to said pupil in such manner that the free parts of the strands are caused to project in definite angular relation from the convex surface of the eye member.

It is an additional feature of my invention to provide an eye member in the form of a shell of celluloid or other thermo-plastic material, the ends of the eyelash strands being impregnated with a similar material and applied to the surface of the shell under the concurrent action of heat and pressure to cause the thermo-plastic material on the strand ends to become homogeneously united with the structure of the eye shell wall and with the strand ends embedded below the convex surface of the shell.

Another feature of the invention resides in the application to the surface of the eye shell of a medium which simulates the upper eyelid, and also extends over and completely conceals the attached ends of the eyelash strands.

With the above and other objects in view, the invention consists in the improved artificial eye and in the form, construction and relative arrangement of its several parts as will be hereinafter more fully described, illustrated in the accompanying drawing, and subsequently incorporated in the subjoined claims.

In the drawing, wherein I have disclosed one simple and practical embodiment of my new artificial eye and for purposes of explanation, I have illustrated a machine for assembling the parts thereof similar to that disclosed in my issued patent, and in which similar reference characters designate corresponding parts throughout the several views,—

Figure 1 is a side elevation illustrating the manner of attaching the eyelash strands to the eye shell, parts of the apparatus being shown in section;

Fig. 2 is a sectional view taken substantially on the line 2—2 of Fig. 1;

Fig. 3 is a horizontal sectional view taken on the line 3—3 of Fig. 1;

Fig. 4 is a detail sectional view of an artificial eye embodying one form of the present invention, and Fig. 5 is a detail rear elevation of the eye member partly in section.

Referring in detail to the drawing, which it will be understood, is merely illustrative of one typical example of apparatus which may be employed, and which of course, implies no limitations herein, since an artificial eye having the novel features of this invention might also be practically produced by means of other forms of apparatus, the base member 5 consists of a heavy metal casting. This member is provided within its upper central part and extending throughout the length thereof with a concave surface 6. A block 7 having a correspondingly convex bottom surface is adapted to be arranged upon the concave surface 6, said block being provided at opposite sides thereof with laterally projecting flanges 8 which are curved in concentric relation to the surface 6 and are each provided with a slot 9 extending in parallel relation to said surface. The ends of the base 6 are centrally provided with threaded openings 10 to receive the clamping screws 11 positioned through the slots 9, said screws having heads provided with convex lower surfaces seating upon the bevelled or chamfered edges 12 of the slots 9. The purpose of this means permitting of the adjustment of the block 7 relative to the base 5 will hereinafter become apparent.

The block 7 is also further provided centrally thereof with a vertically extending opening 12 to receive the screw 13, the upper end of said opening being reduced in diameter to provide an internal shoulder against which the head of the screw 13 seats. This screw is adapted to be threaded into a central socket or recess provided in a semi-spherical anvil member 14. The lower face of this member 14 is provided with a diametrically extending slot or groove 15 therein, one end of which is adapted to receive an upstanding rib or key lug 16 formed on the block 7 whereby said member 14 will be fixedly held against turning movement.

A vertically movable pressure applying head or hammer 18 is adapted to be actuated by a foot treadle or any other suitable means and carries an electrical heating unit of any preferred type as indicated at 19 whereby said head 18 may be heated to a predetermined temperature. One side of the head 18 is cut away or recessed as indicated at 20 and the lower face of said head is also provided with a cavity 21 therein which is adapted to receive the upper portion of the semispherical eye shell member 22 arranged upon the anvil 14. This eye member which is drawn from a sheet of celluloid or other thermo-plastic material is provided on its outer surface at a point in predetermined relation to the edge of said shell at the open end thereof with a representation of the pupil of the human eye as indicated at 23. The edge of the eye shell is provided with a rectangular notch or recess 24 located in a plane intersecting the central axis of the eye shell and the center of the pupil 23. This recess receives the key lug 16 on the block 7, thereby preventing rotative movement of the shell relative to the anvil 14 and positively fixing the relation between the center of the eye pupil 23 and the axial center line of the movable presser member 18.

A guide table or bed plate 25 is arranged with one edge thereof opposed to the recessed side 20 of the presser member 18 and the upper surface of said table is positioned in a plane which is slightly above the eye shell 22. Over the surface of this table a plurality of eyelash forming strands indicated at S are adapted to be simultaneously moved by a suitably mounted feed roller 26. These strands S preferably consist of silk threads impregnated or coated with a thermoplastic material such as shellac or cellulose which renders the strands somewhat stiff or rigid. These coated strands are adapted to be projected beyond the edge of the table 25 by the operation of the roller 26 until their ends rest upon the surface of the eye shell 22 at the approximate center thereof and above the eye pupil 23. With the strands thus positioned in closely spaced relation to each other upon the surface of the eye shell, the member 18 is brought downwardly upon the strand ends, and under the pressure thereby created and the heat transmitted through said member from the heating unit 19, the coating solution on the strand ends and the part of the wall of the eye shell 22 with which they are engaged are reduced to a semi-plastic state so that the coating solution on the strands homogeneously unites with the material of the eye shell wall and the strand ends are embedded in and incorporated with the wall structure of the eye shell. Approximately at the same time that the member 18 exerts the holding pressure on the strand ends, a vertically movable knife blade indicated at 27 cooperating with the edge of the table 25 cuts off the strands S to definite length. It will be noted from reference to Fig. 2 that the concave surface 21 of the member 18 in the direction of the longer axis of the eye pupil 23 is substantially concentric with the outer surface of the eye shell wall so that said member will exert a uniform bearing pressure upon the spaced ends of the strands. In the other direction, lengthwise of the strands, the said curved surface 21 is slightly eccentric with respect to the outer surface of the eye shell so that there is bearing contact of the member 18 upon the shell wall approximately only over that area thereof upon which the strand ends are engaged, as clearly indicated in Fig. 1 of the drawing. This permits of the expansion of the shell wall and obviates possible distortion thereof.

After the strand ends have been embedded in the wall structure of the eye shell as has been explained, the member 18 is lifted and the eye shell with the lashes attached thereto removed from the anvil 14. There is now applied to the section of the outer surface of the eye shell above the pupil 23 a paint or coloring solution indicated at 28. This coloring solution simulates the upper eyelid and extends over the attached or embedded ends of the eyelash strands so as to completely conceal said strand ends. In the drawing, for the sake of clarity, the thickness of the wall of the eye shell 22 has been greatly exaggerated and also in Fig. 4 of the drawing, the thickness of the coating of paint or coloring solution 28 is likewise much exaggerated. In fact, to the eye of the observer, any variation in the elevation of the external surface of the eye shell wall at the opposite sides of the attached ends of the eyelashes is not discernible, and the coating paint 28 has no effect in so far as the free oscillation of the eye member in the internal socket of the doll head wall is concerned.

It will be noted that the apparatus above described permits of the attachment or application of the eyelash strands to eye shells of various sizes, it being only necessary to remove the block 7 and then detach the anvil 14 and apply an anvil of a different size thereto. The block 7 is then again attached to the base 5 by the screws 11 and said block properly adjusted relative to said base as may be required in order to position the eye shell so that the lash strands will engage at the proper point on the surface of the shell wall relative to the pupil 23 for the application of pressure thereto by means of the member 18.

From the above description, and with particular reference to Figs. 4 and 5 of the drawing, it will be seen that the attached eyelash strands S which are comparatively stiff owing to their impregnation with the thermo-plastic material, are sustained in definite angularly extending relation, with the convex surface of the shell 22, by reason of the embedment of the ends of the strands in the shell surface below its convex surface. Also instead of the mere adhesive attachment of the strands to the shell as heretofore practiced in the art, the strand ends are permanently embodied or incorporated in the shell structure itself so that their accidental detachment therefrom is practically precluded and the individual strands appear to emerge directly from the shell structure at the lower edge of the eyelid represented by the film of concealing medium 28 which extends over and completely covers the attached ends of the strands. Thus, also I avoid the necessity of applying an adhesive solution to the surface of the shell and overlying covering sheet of celluloid for the purpose of representing the upper eyelid, and which interferes with a proper cooperative relation between the convex surface of the eye member and the wall of the eye socket in the doll head. It will further be apparent that an artificial eye member of this new construction is capable of quantity production by means of unskilled labor and at comparatively low manufacturing cost.

While I have herein shown and described one simple and practical embodiment of my present improvements, it will nevertheless, be understood that the essential features thereof are susceptible of embodiment in various other alternative structures, and I accordingly reserve the privilege of resorting to all such legitimate changes therein as may be fairly incorporated in the spirit and scope of the invention as claimed.

I claim:

1. An artificial eye for dolls and the like consisting of an eye shell of thermo-plastic material having a pupil represented on the outer surface thereof, and eyelash forming strands impregnated with a thermo-plastic solution, and said solution constituting attaching means for the eyelash strands homogeneously incorporated in the structure of the eye shell wall.

2. An artificial eye for dolls and the like consisting of an eye shell of thermo-plastic material having a pupil represented on its outer surface, eyelash forming strands impregnated with a thermo-plastic solution constituting means homogeneously incorporated with the structure of the shell wall for securing the ends of said strands in permanently attached relation to said shell, and a coating of coloring material on the outer surface of the shell wall representing the upper eyelid and extending over the attached ends of the eyelash forming strands to conceal the same.

LEO J. GRUBMAN.